United States Patent
Wu

(10) Patent No.: US 9,853,865 B2
(45) Date of Patent: *Dec. 26, 2017

(54) METHOD AND APPARATUS FOR LAYER 2 DISCOVERY IN A MANAGED SHARED NETWORK

(71) Applicant: Entropic Communications, LLC, Carlsbad, CA (US)

(72) Inventor: Zong Liang Wu, San Diego, CA (US)

(73) Assignee: ENTROPIC COMMUNICATIONS, LLC, Carlsbad, CA (US)

(*) Notice: Subject to any disclaimer, the term of this patent is extended or adjusted under 35 U.S.C. 154(b) by 110 days.

This patent is subject to a terminal disclaimer.

(21) Appl. No.: 14/801,149

(22) Filed: Jul. 16, 2015

(65) Prior Publication Data

US 2015/0326445 A1 Nov. 12, 2015

Related U.S. Application Data

(63) Continuation of application No. 12/688,518, filed on Jan. 15, 2010, now Pat. No. 9,106,554.

(Continued)

(51) Int. Cl.
*H04L 12/24* (2006.01)
*H04L 12/28* (2006.01)
(Continued)

(52) U.S. Cl.
CPC .......... *H04L 41/12* (2013.01); *H04L 12/2807* (2013.01); *H04L 12/2838* (2013.01);
(Continued)

(58) Field of Classification Search
CPC . H04L 12/24; H04L 12/2807; H04L 12/2838; H04L 2012/2849; H04L 41/00;
(Continued)

(56) References Cited

U.S. PATENT DOCUMENTS 6,006,091 A * 12/1999 Lupien .................. H04W 8/20
455/419
6,246,879 B1 * 6/2001 Segura .................. H04L 12/24
370/400

(Continued)

FOREIGN PATENT DOCUMENTS

WO 0002350 1/2000
WO 2008101112 8/2008

*Primary Examiner* — Michael C Lai
(74) *Attorney, Agent, or Firm* — McAndrews, Held & Malloy, Ltd.

(57) ABSTRACT

Methods and systems are provided for Layer 2 (L2) discovery in a managed shared network, such as a Multimedia over Coax Alliance (MoCA) network. A network controller node of the MoCA network node may receive, from a node entering the MoCA network, a submission requesting discovery of information regarding communication capabilities of a plurality of nodes in the network. In response to the request, the network controller node may obtain from one or more nodes of the plurality of nodes information regarding communication capabilities of the plurality of nodes, and may send the communication capabilities of the plurality of nodes, such as to a second plurality of nodes.

20 Claims, 4 Drawing Sheets

Related U.S. Application Data

(60) Provisional application No. 61/145,722, filed on Jan. 19, 2009.

(51) Int. Cl.
  *H04N 21/436* (2011.01)
  *H04N 21/643* (2011.01)

(52) U.S. Cl.
  CPC ....... *H04L 41/00* (2013.01); *H04N 21/43615* (2013.01); *H04N 21/643* (2013.01); *H04L 2012/2849* (2013.01)

(58) Field of Classification Search
  CPC . H04L 41/12; H04N 21/43615; H04N 21/643
  See application file for complete search history.

(56) References Cited

U.S. PATENT DOCUMENTS

| | | | | |
|---|---|---|---|---|
| 6,795,704 | B1 * | 9/2004 | Hardin | H04L 67/303 455/414.1 |
| 7,756,958 | B2 * | 7/2010 | Nagarajrao | H04L 12/24 370/254 |
| 2004/0233904 | A1 * | 11/2004 | Saint-Hilaire | H04L 12/2805 370/389 |
| 2004/0260800 | A1 * | 12/2004 | Gu | H04L 12/2805 709/223 |
| 2005/0130658 | A1 * | 6/2005 | Stephens | H04W 36/26 455/436 |
| 2006/0227725 | A1 * | 10/2006 | Huotari | H04L 41/082 370/254 |
| 2006/0280197 | A1 * | 12/2006 | Stone | H04L 12/2801 370/437 |
| 2007/0001853 | A1 * | 1/2007 | Otranen | G06K 7/0008 340/572.1 |
| 2007/0149210 | A1 * | 6/2007 | McKiou | H04W 64/00 455/456.1 |
| 2007/0171842 | A1 * | 7/2007 | Dow | H04L 29/12783 370/254 |
| 2008/0034081 | A1 * | 2/2008 | Marshall | G08C 17/02 709/223 |
| 2008/0192752 | A1 * | 8/2008 | Hyslop | H04W 74/06 370/395.21 |
| 2008/0201748 | A1 * | 8/2008 | Hasek | H04N 7/17309 725/98 |
| 2009/0180782 | A1 * | 7/2009 | Bernard | H04B 10/25751 398/140 |
| 2009/0193474 | A1 * | 7/2009 | Stein | H04L 12/2812 725/82 |
| 2010/0162329 | A1 * | 6/2010 | Ford | H04L 12/2801 725/81 |
| 2010/0281051 | A1 * | 11/2010 | Sheffi | H04L 67/2819 707/770 |
| 2011/0080850 | A1 * | 4/2011 | Klein | H04L 12/2801 370/254 |
| 2011/0208853 | A1 * | 8/2011 | Castro-Castro | H04L 12/14 709/223 |
| 2013/0039186 | A1 * | 2/2013 | Ohana | H04L 12/2801 370/235 |

\* cited by examiner

METHOD AND APPARATUS FOR LAYER 2 DISCOVERY IN A MANAGED SHARED NETWORK

CLAIM OF PRIORITY AND CROSS-REFERENCE TO RELATED APPLICATIONS

This patent application is a continuation of U.S. patent application Ser. No. 12/688,518, filed Jan. 15, 2010, now U.S. Pat. No. 9,106,554, which in turn claims the benefit of U.S. Provisional Patent Application Ser. No. 61/145,722, filed Jan. 19, 2009. Each of the above identified applications is herein incorporated by reference in its entirety.

TECHNICAL FIELD

The presently disclosed method and apparatus relates generally to communication networks, and more particularly, some embodiments relate to network node discovery.

DESCRIPTION OF THE RELATED ART

A home network may include multiple types of subscriber equipment configured to deliver subscriber services throughout the home. These subscriber services include delivering multimedia content, such as streaming audio and video, through the home network to subscriber equipment, where it is presented to a user. As the number of available subscriber services has increased and they become more popular, the number of devices being connected within each home network has also increased. The increase in the number of services and devices increases the complexity of coordinating communication between the network nodes.

Home networks typically specify quality of service (QoS) parameters to ensure that user content is delivered within an expected quality standards appropriate to different categories of services. This can help to ensure satisfaction in the user experience. The MoCA (Multimedia over Coax Alliance) network, for example utilizes a centralized network controller to set up parameterized quality of service (PQoS) standards for network communications among nodes.

In MoCA networks, to achieve a given level of QoS, the transmitter and receiver(s) of a given data flow typically must share a common set of functional parameters or capabilities. However, with increasing numbers of devices, a uniform quality of service is not always attainable as different devices may have different capacities and capabilities. For example, some network devices have limited receiving capacity due to various device constraints such as, for example, system bus throughput, receiver buffer size, capability of packet aggregation, and so on. This is compounded by the fact that network devices are generally unaware of the capabilities of other devices on the network, and therefore network devices cannot determine whether certain QoS requirements can be met. As another example, certain classes of devices may have certain features that can be activated only if both the transmitter and the receiver(s) are known to be of the same class (such as, for example, a class ID or a vendor ID, or a functional class such as Set-Top-Box, Digital Video Recorder, Broadband Home Router, etc.).

BRIEF SUMMARY

According to various embodiments of the disclosed method and apparatus, nodes on a network (also referred to as network devices) are programmed to generate and submit a request to a network controller to discover information about capabilities of other nodes on the network. The network controller is configured to send a request to other network nodes to request this information. For example, in one embodiment, a request is broadcast to all nodes in the network to request the capabilities information, or the request can be sent to a subset of nodes. Once received, the network controller provides the capability information to the network nodes so that these nodes have information about capabilities of the other nodes. This information can also be broadcast to all nodes in the network so that all nodes are informed about the other nodes' capabilities, or sent to a subset of interested nodes. The capability information requested and received can describe or identify the capabilities of the respective network nodes such as, for example, receive capabilities (e.g., bandwidth, burst, packet size, etc.), transmit capabilities, node personality, vendor source or ID, node interface and so on.

According to various embodiments, a system and method for determining node communication capabilities in a MoCA network having a network controller node and a plurality of associated network nodes, includes a process for receiving in the network controller node a submission requesting discovery of information regarding the communication capabilities of a first plurality of nodes in the network; the network controller node sending a request for discovery of node communication capabilities to the first plurality of nodes in the network; the network controller node receiving responses from the first plurality of nodes, wherein each response comprises information regarding communication capabilities of its respective node; and the network controller node sending the received information regarding communication capabilities of the plurality of nodes to a second plurality of nodes in the network. In various embodiments, the submission received by the network controller identifies nodes that comprise the first plurality of nodes. The communication capabilities for a given node can include, for example, at least one of:

a MoCA specification version supported by the node;
    whether the node supports L2ME;
    the aggregation capability of the node;
    whether the node supports 16-node;
    whether the node supports a preferred network controller node;
    whether the node supports channel bonding;
    receive capabilities of the node;
    transmit capabilities of the node; and
    node personality (for example, Set-Top-Box, Digital Video Recorder, Broadband Home Router, High-Definition, Standard Definition, Vendor ID etc.); and
    the node's host interface.

In some embodiments, the submission received by the network controller is sent by an entry node in the network and comprises information specifying network nodes that make up the first plurality of network nodes. In various embodiments, the submission received by the network controller includes information specifying which communication capabilities to include in the request for discovery of node communication capabilities.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict either typical embodiments or examples of particular embodiments. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

According to various embodiments of the disclosed method and apparatus, nodes on a network (also referred to as network devices) are programmed to generate and submit a request to a network controller to discover information about capabilities of other nodes on the network. This initiator node may be the network control node itself, or another node on the network. The network controller, or network control node, is configured to send a request to other network nodes to request this information. For example, in one embodiment, a request is broadcast to all nodes in the network to request the capabilities information, or the request can be sent to a subset of nodes. Once received, the network controller provides the capability information to the network nodes so that these nodes have information about capabilities of the other nodes. This information can also be broadcast to all nodes in the network so that all nodes are informed about the other nodes' capabilities, or sent to a subset of interested nodes.

The capability information requested and received can describe or identify the capabilities of the respective network nodes such as, for example, receive capabilities (e.g., bandwidth, burst, packet size, etc.), transmit capabilities, node personality, node interface and so on. In an exemplary MoCA environment, this information can include a MoCA Spec Version supported by the device, whether the device supports MoCA L2ME messaging protocols, the device's aggregation capability (e.g., Number of SPUs, Maximum Size of aggregated packet), whether the device supports 16-node or a preferred NC (network control node), whether the device supports channel bonding, the device's Receive-Capability (e.g., whether TSpec is supported, such as Bandwidth, burst, packet size etc.); the device's TransmitCapability (e.g., whether TSpec is supported), the Node Personality (e.g., HD-STB, SD-STB, DVR, BHR, ECB_L2, ECB-L3, Vendor ID, etc.), and the Node's Host Interface (e.g., PCI, xMII).

Figure 1:
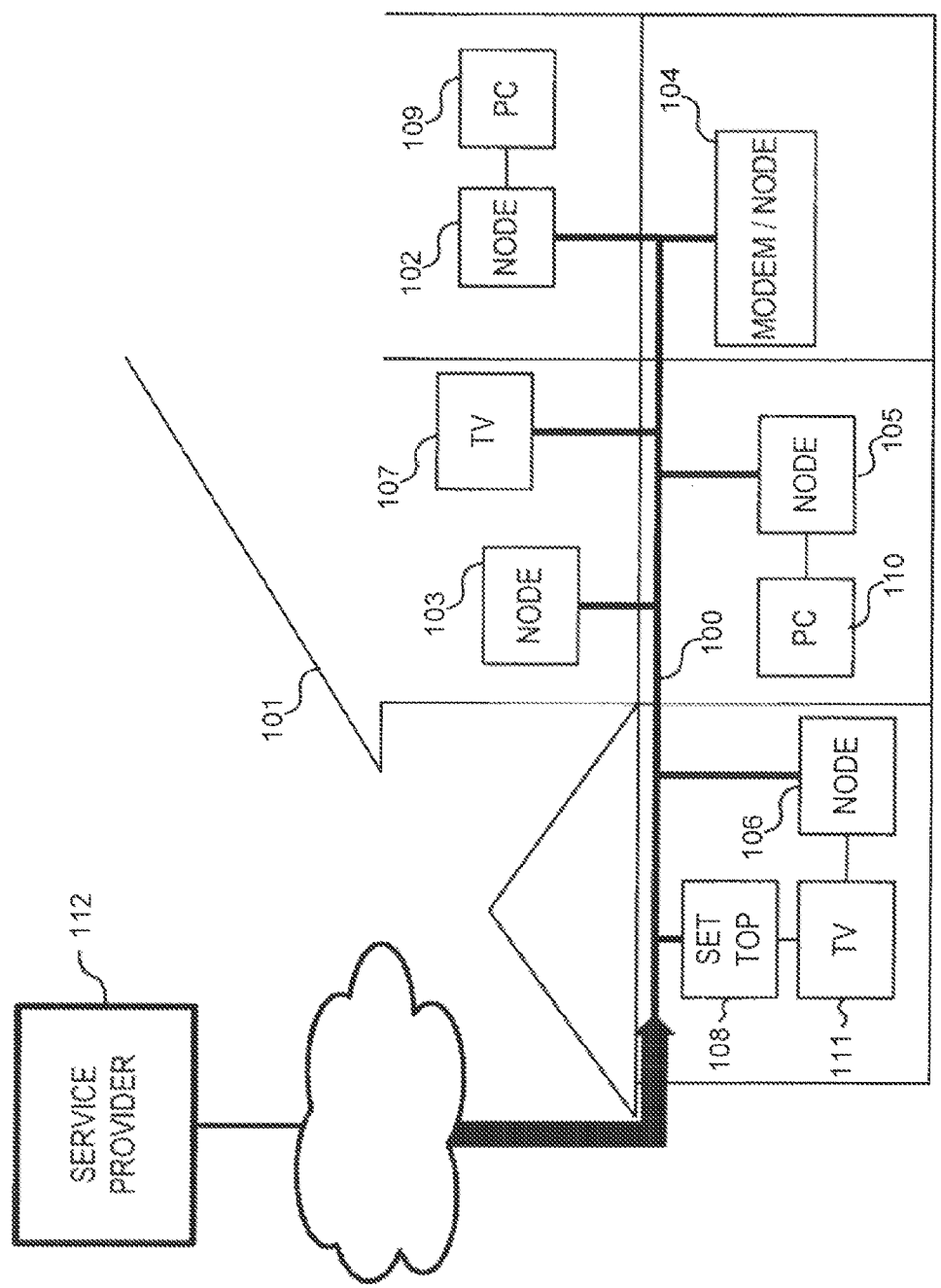
FIG. 1 illustrates an example of one environment in which some embodiments of the disclosed method and apparatus may be implemented.

Before describing the disclosed method and apparatus in detail, it is useful to describe an example of an environment in which the disclosed method and apparatus can be implemented. The network of FIG. 1 will be described for this purpose. A wired communications medium 100 is shown. In some embodiments, the wired communications medium might be a coaxial cable system, a power line system, a fiber optic cable system, an Ethernet cable system, or other similar communications medium. Alternatively, the communications medium might be a wireless transmission system. In the illustrated embodiment, the communications medium 100 is preinstalled coaxial cabling deployed within a residence 101.

The network comprises a plurality of network nodes 102, 103, 104, 105, 106 in communication according to a communications protocol. For example, the communications protocol might comprise a networking standard, such as the Multimedia over Coax Alliance (MoCA) standard. In the illustrated embodiment, the communications protocol specifies a packet based communications system. In this embodiment, physical layer (PHY) packets comprise preambles and payloads. A PRY preamble is typically inserted at the beginning of each packet to assist receivers in detecting and acquiring the physical layer parameters to properly decode the packet. The communications protocol may have a plurality of pre-defined PHY preambles to use with different types of network communications. For example, one type of preamble may be used when transmitting in a diversity mode (a communication mode in which little is known about the communication channel). Another type of preamble may be used when transmitting a media access plan (MAP) message. Other types of packets may use other types of preambles.

A PHY payload is used to transmit the data content of the packet. In some cases, the PHY payload has a predetermined format. For example, in a MoCA network, network maintenance messages and MAP messages each have a format that is determined by the MoCA protocol. In other cases, the PHY payload may have undetermined format. For example, the PHY payload of a media streaming transmission might comprise an embedded Ethernet packet or a portion thereof.

In some embodiments, activity on the network is controlled by a network controller (NC) node. In one such embodiment, one of the nodes is selected to perform the functions of the NC based upon a process defined by the communications protocol. In networks employing an NC, the NC schedules network communications between network nodes using a MAP. The MAP is sent as a packet. Such MAP packets are sent on a regular basis. MAPs are generated in response to reservation requests by the nodes of the network. The NC also performs admission procedures when a new node requests admission to the network.

Nodes described herein can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices 103 that plays music. A node might also be associated with a module configured to interface with an internet or cable service provider 112, for example to provide Internet access, digital video recording capabilities, media streaming functions, or network management services to the residence 101.

Figure 2:
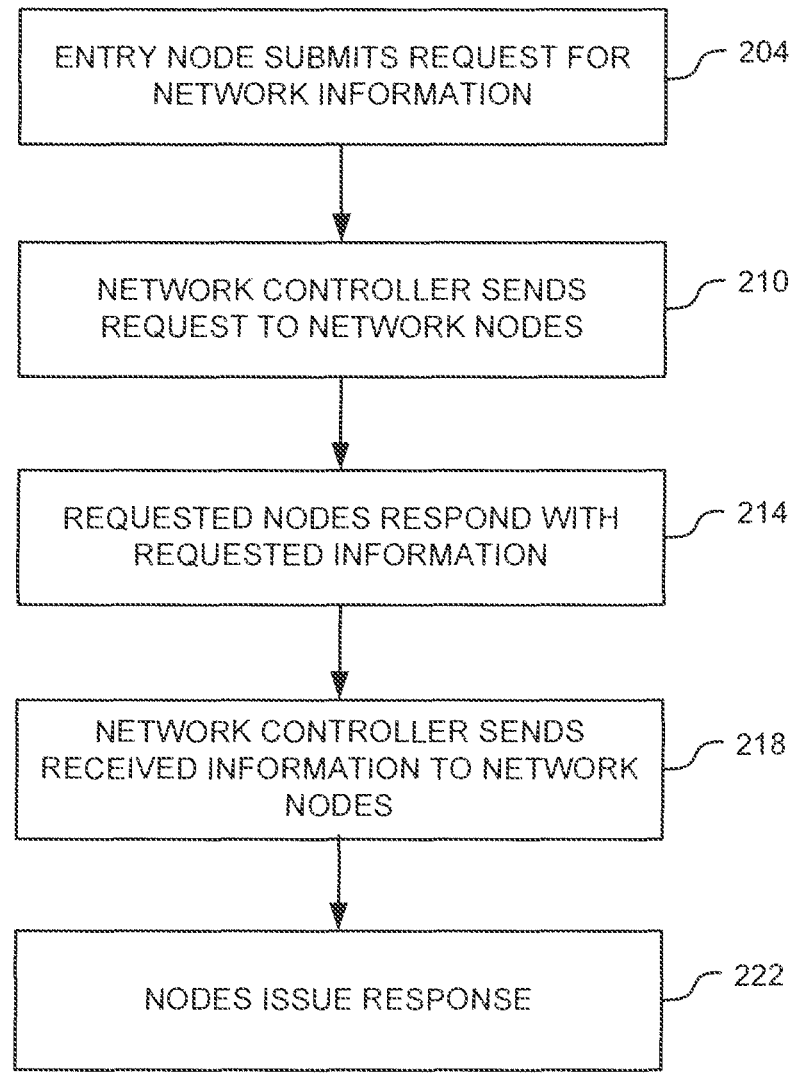
FIG. 2 is a diagram illustrating an example process for discovering network node capabilities in accordance with the system and method described herein.

FIG. 2 is a diagram illustrating an example process for discovering network node capabilities in accordance with the system and method described herein. In block 204, a node sends a request for information regarding capabilities of other nodes in the network. For example, in one embodiment, a node entering a network can send a request to the network controller node requesting this information. In some embodiments this can be a generic request, and in one embodiment, the requesting node can request specific information parameters.

In block 210, the network controller sends a request to other nodes in the network to request the capability information of those nodes. In some embodiments, the network controller can send a broadcast message to all nodes in communicative range of the network controller, while in other embodiments, the request message can be sent to a predetermined set of specified nodes. The set of nodes, for example, might be determined by node class or capabilities, or as specified by the requesting node. In yet another embodiment, the network controller may store a list of capabilities for each node, and only send a request to new nodes on the network, or to nodes for which the network controller does not have this information.

In block 214, the nodes to which the request was sent, respond to the request. The response by each responding node includes information about that node's capabilities. Particularly, in various embodiments, the information is information relevant to the node's capabilities in terms of its ability to meet various Quality of Service requirements. Examples of such information can include MoCA Spec Version supported by the node, whether the node supports MoCA L2ME messaging protocols, the node's aggregation capability (e.g., Number of SPUs, Maximum Size of aggregated packet), whether the node supports 16-node or a preferred network control node, whether the node supports channel bonding, the node's ReceiveCapability (e.g., whether TSpec is supported, such as Bandwidth, burst, packet size etc.); the node's TransmitCapability (e.g., whether TSpec is supported), the Node Personality (e.g., HD-STB, SD-STB, DVR, BHR, ECB_L2, ECB-L3, Vendor ID, etc.), and the Node's Host Interface (e.g., PCI, xMII).

In block 218, the network controller sends the received information to the requesting node. In one embodiment, rather than sending the information to only the requesting node, the network controller sends the information to several network nodes. For example, the network controller in one embodiment is configured to broadcast the received information to all network nodes or to send the information to a determined subset of nodes.

In block 222 the nodes respond to the network controller in accordance with networking protocol. For example, in the case of a MoCA application, the receiving nodes respond per WAVE_NODEMASK indicating the communication was received.

Discovery of node capabilities at layer 2 can be useful for a number of reasons. For example, such discovery can allow a centralized network controller to set up PQoS to selected nodes. As a further example, embodiments can be implemented wherein PQoS is set up for only certain OSP devices, and not for other devices like retail ECBs. Furthermore, some devices have limited receiving capacity due to various reasons like system bus throughput, receiver buffer size, packet aggregation capabilities and so on. Accordingly, the received information can be used by the transmitter to make a decision regarding data transmission to a given node. This is used in various embodiments, for example, to prevent overflowing the receiver and suffering packet loss, to support aggregation to a determined extent, to determine an appropriate amount of data to send in a given time interval, and so on. Furthermore, a messaging mechanism such as that described herein can be used to support application features current and future generations of MoCA standards.

The method and apparatus defined herein provide the capability for a network node, such as a MoCA node, to discover the capabilities of other MoCA nodes. In one embodiment, each MoCA node is configured to include a capability descriptor for the information. As described above, a network device may read the device capability descriptor of other devices. This can be done through the messaging flows described herein. A given node can discover the device capabilities for the entire Device Capability Descriptor or for selected Capability Items included therein. For example, an entry node in one embodiment is configured to specify one or more capability items it is to discover, such as those needed to make QoS determinations.

In one embodiment, The Device Capability Descriptor may contain any number of Capabilities that are useful and needed in helping other devices in the network to communicate correctly and efficiently with it.

Figure 3:
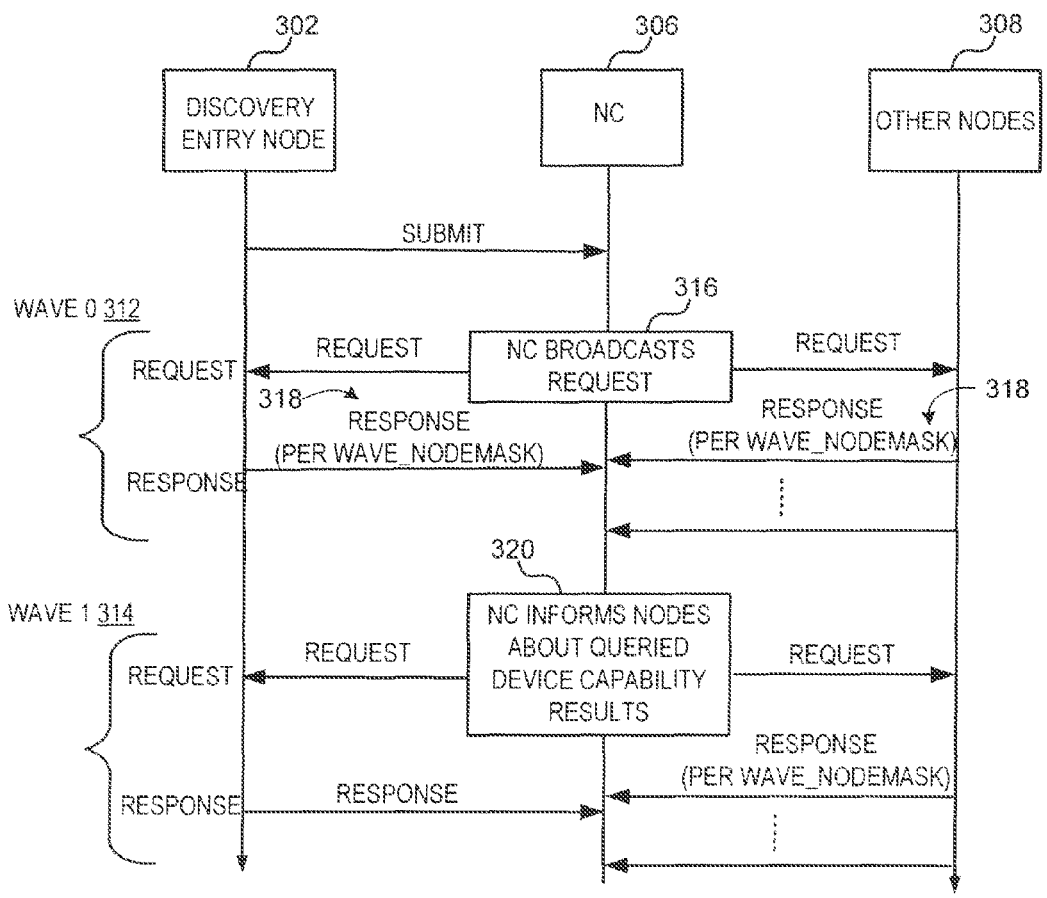
FIG. 3 is a diagram illustrating an example flow of signals exchanged for a discovery transaction in accordance with one embodiment of the method and apparatus described herein.

FIG. 3 is a diagram illustrating an example flow of signals exchanged for a discovery transaction in accordance with one embodiment of the method and apparatus described herein. In various embodiments, the flow depicted in FIG. 3 follows the process outlined above with reference to FIG. 2. Referring now to FIG. 3, the Network controller node 306 initiates a discovery transaction to discover capabilities of network nodes. In one embodiment, the network controller node 306 starts a discovery transaction when it receives a submission from a network node 302. For example, in one embodiment, a network node 302 sends a Submit L2ME Frame from a node (for example, a BHR node) or on its own (if the NC node is the BHR). The Discovery Transaction in one embodiment organized as two L2ME Waves 312, 314 as illustrated in FIG. 3. The Submit L2ME frame can be in the format specified by the MoCA 1.1 specification. In addition, Table 1 illustrates an example embodiment of L2ME frame constraints. As seen in the example of Table 1, the TRANS_TYPE field includes a value to indicate the Submit L2ME Frame is a discovery frame, as does the TRANS_SUBTYPE field. Additionally, the WAVE0_NODEMASK field shown in the example of Table 1 specifies the nodes that are to respond with their Discovery data (e.g., their Capability Descriptor).

TABLE 1

| Submit L2ME Frame | | |
|---|---|---|
| Field | Length | Usage |
| L2ME Submit Header | | |
| HDR_FMT | 8 bits | 0x8 |
| ENTRY_NODE_ID | 8 bits | The ID of the node sending this message |
| ENTRY_INDEX | 8 bits | An Entry node provided value; MAY be used by Entry node to track responses to this Submit message |

TABLE 1-continued

Submit L2ME Frame

| Field | Length | Usage |
|---|---|---|
| RESERVED | 8 bits | Type III as defined in the MoCA 1.1 Specification |
| VENDOR_ID | 16 bits | Entropic: for Vendor proprietary discovery protocol<br>0: for MoCA standard protocol |
| TRANS_TYPE | 8 bits | If VENDOR ID = 0<br>0x1 = PQoS transactions -See Section 4<br>0x2 = FMR<br>0x3 = Discovery<br>All other values Reserved for future use<br>For other values of VENDOR_ID, the use of this field is vendor-specific. |
| TRANS_SUBTYPE | 8 bits | Subtype of L2ME Transaction;<br>0x1 = Discovery |
| WAVE0_NODEMASK | 32 bits | Specifies the nodes that must Must respond with their Discovery data (Capability Descriptor) |
| RESERVED | 32 bits | |
| RESERVED | 8 bits | |
| MSG_PRIORITY | 8 bits | 0x80 |
| TXN_LAST_WAVE_NUM | 8 bits | 0x1 |
| RESERVED | 8 bits | L2ME transaction Payload |
| L2ME_PAYLOAD | Variable length | reserved |

In accordance with the example embodiment illustrated in FIG. 3, in response to the submit frame, Wave 0 312 of the discovery transaction commences.

In the Wave 0 312 that follows the Discovery Submit message, the Network controller node 306 queries the set of nodes 308 specified. This is illustrated by block 316 of FIG. 3 and the requests illustrated as being sent by block 316. In one embodiment, the nodes to be queried are specified in the WAVE0_NODEMASK, an example of which is shown in Table 1. In this wave, the Network controller node 306 initiates Wave 0 312 using a request frame sent to the specified nodes.

In one embodiment, the frame sent is a Request L2ME Frame with a format as described in Section 2.2.3.2 of the MoCA 1.1 specification. The request L2ME frame in one embodiment is based on the Submit L2ME Frame. The Discovery Entry node MAY include itself in the WAVE0_NODEMASK. Table 2 illustrates an example of the request L2ME frame in accordance with one embodiment of the apparatus and method described herein.

TABLE 2

L2ME Request Frame

| Field | Length | Usage |
|---|---|---|
| L2ME Request Header | | |
| HDR_FMT | 8 bits | 0x9 |
| ENTRY_NODE_ID | 8 bits | The ID of the Entry node that submitted the transaction; 0xFF = no Entry node (i.e., the Transaction was initiated by the NC node). |
| ENTRY_INDEX | 8 bits | Copied from the initiating Submit message; 0 = no Entry node |
| WAVE_SEQ_N | 8 bits | An NC counter, which is held constant for all the L2ME Wave Cycles in an L2ME Wave, and is incremented when a new L2ME Wave starts. The NC node MUST increment this counter without resetting from the last L2ME Wave in an L2ME Transaction to the first L2ME Wave in the next L2ME Transaction in the netwok. |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0<br>If there is an Entry node, copied from initiating Submit field<br>WAVE0_NODEMASK; otherwise as desired by the NC<br>If (TXN_WAVE_N ≠ 0), see text immediately below this table |

TABLE 2-continued

L2ME Request Frame

| Field | Length | Usage |
|---|---|---|
| CYCLE_NODEMASK | 32 bits | The subset of WAVE_NODEMASK where the NC node requires a Response in this Wave Cycle; see the MoCA 1.1 Specification |
| WAVE_STATUS | 8 bits | Bits 7:3 reserved Type III as defined in the MoCA 1.1 Specification<br>Bit 2: RESP_FAIL = 1 if response was not received from the requested node in previous Wave. This indicates that this is the last L2ME Wave due to transaction failure; otherwise = 0<br>Bit 1: 0x0 reserved Type III as defined in the MoCA 1.1 Specification<br>Bit 0: FINAL_SUCCESS = 1 if the NC node declares this Wave as the last Wave with no errors; otherwise = 0 |
| DIR_LEN | 8 bits | 0x10 - If L2ME_PAYLOAD field has payload type "Concatenated", and in Request L2ME Frame of Wave 1 of Maintenance PQoS Flow Transaction (Section 4.6.3.1), otherwise 0x0. |
| TXN_SEQ_N | 8 bits | A transaction sequence number, which is held constant for all the L2ME Waves in an L2ME transaction, and is incremented by the NC node when a new L2ME transaction starts |
| TXN_WAVE_N | 8 bits | Wave number within the L2ME transaction, starting with 0 for initial Wave, and incremented by 1 for each subsequent Wave, except for the situation described in the MoCA 1.1 Specification wherein the TXN_WAVE_N entry is set to TXN_LAST_WAVE_NUM. |
| L2ME Payload | | |
| L2ME_PAYLOAD | Variable length | Reserved |

In response, the requested nodes 308 send a response 318 to the network controller node 306. In one embodiment, each requested node must respond. In the illustrated example embodiment, the requested nodes send a Response L2ME frame, with a format as shown in the MoCA 1.1 specification. An example of such a Response L2ME frame is illustrated in Table 3. In this example, the frame payload, L2ME PAYLOAD, contains the node's capability descriptor. In some embodiments, the descriptor is encoded in a format such as, for example, TLV.

In wave 1 314, the NC node 306 informs a set of nodes about the queried discovery results from Wave 0 312. This is illustrated at block 320. In one embodiment, the NC node 306 initiates Wave 1 using a Request L2ME Frame with format as shown in Section 2.2.3.2. of MoCA 1.1 spec with the "concatenated" type of L2ME_PAYLOAD as specified in 2.2.3.2 table 2-4 of the MoCA 1.1 spec. An example frame is illustrated in Table 4.

TABLE 3

Response L2ME Frame

| Field | Length | Usage |
|---|---|---|
| Response L2ME Header | | |
| HDR_FMT | 8 bits | 0xA |
| RESP_STATUS | 8 bit | Bits 7:4 - reserved Type III as defined in the MoCA 1.1 Specification<br>Bit 3: DO_ENTRY_CANCEL = '1' iff the Entry node requires during Wave 0 that the NC node not to issue any further Waves in the transaction<br>Bit 2: IN_NEXT_WAVE = '1' iff the node MUST be included in WAVE_NODEMASK in the next Wave<br>Bit 1: 0x0 reserved Type I<br>Bit 0: 1 (for nodes that understand the Discovery Protocol) |
| RESERVED | 8 bits | Type III as defined in the MoCA 1.1 Specification |
| WAVE_SEQ_N | 8 bits | Copied from initiating Request |
| RESERVED | 32 bits | Type III as defined in the MoCA 1.1 Specification |
| Response L2ME Payload (Optional) | | |
| L2ME_PAYLOAD | Variable length | Contains this node's Capability Descriptor (may be encoded in a format like TLV) |

TABLE 4

L2ME Request

| Field | Length | Usage |
|---|---|---|
| | L2ME Request "concatenated" Payload | |
| For (i=0; i<N; i++) { | | N = DIR_LEN |
| DIR_NODE_ID | 8 bits | Node ID that sent Response i or 0xFF if directory entry i and subsequent directory entries are unused. The NC node need not organize the Node ID's of nodes in the MoCA Network in DIR_NODE_ID entries in any particular order. However, the NC MUST make sure that once a DIR_NODE_ID entry contains 0xFF, all subsequent DIR_NODR_ID entries after that will also contain the value 0xFF. |
| DIR_RESP_INFO | 8 bits | Values [0 . . . (L_RESP_MAX)] indicate the length of the payload in the Response from DIR_NODE_ID in units of 4 byte words. The following values have special meanings and indicate zero length: UNRECOGNIZED = 0xFF - the node's Response header indicated it could not interpret the previous Request OVERFLOW = 0xFE- the node's Response could not be included given L_REQ_MAX When the preceding DIR_NODE_ID field contains 0xFF, the value of DIR_RESP_INFO field is "don't care." |
| } | | |
| RESP_DATA | Variable length | An integral number of variable length Response payloads, parsable by traversing lengths interpreted from the directory |

As illustrated in the example flow diagram of FIG. 3, in one embodiment, the discovery transaction is completed when the discovery entry node 302 and other requested nodes 308 send their final response. For example, the final response can be a Response L2ME Frame with the format as described in Section 2.2.3.3. of the MoCA 1.1 spec to the NC node.

In one embodiment of a MoCA implementation, the following additional restrictions are placed on various fields:
RESP_STATUS=ignored by the receiving node
L2ME_PAYLOAD=32 bit 0x0: Tune III In various embodiments, at the end of the discovery protocol, the network nodes 308, 302 know the Node Capability of other nodes 302, 308 in the network. This allows one node to discover the capability of one, multiple or all other nodes in a network.

Figure 4:
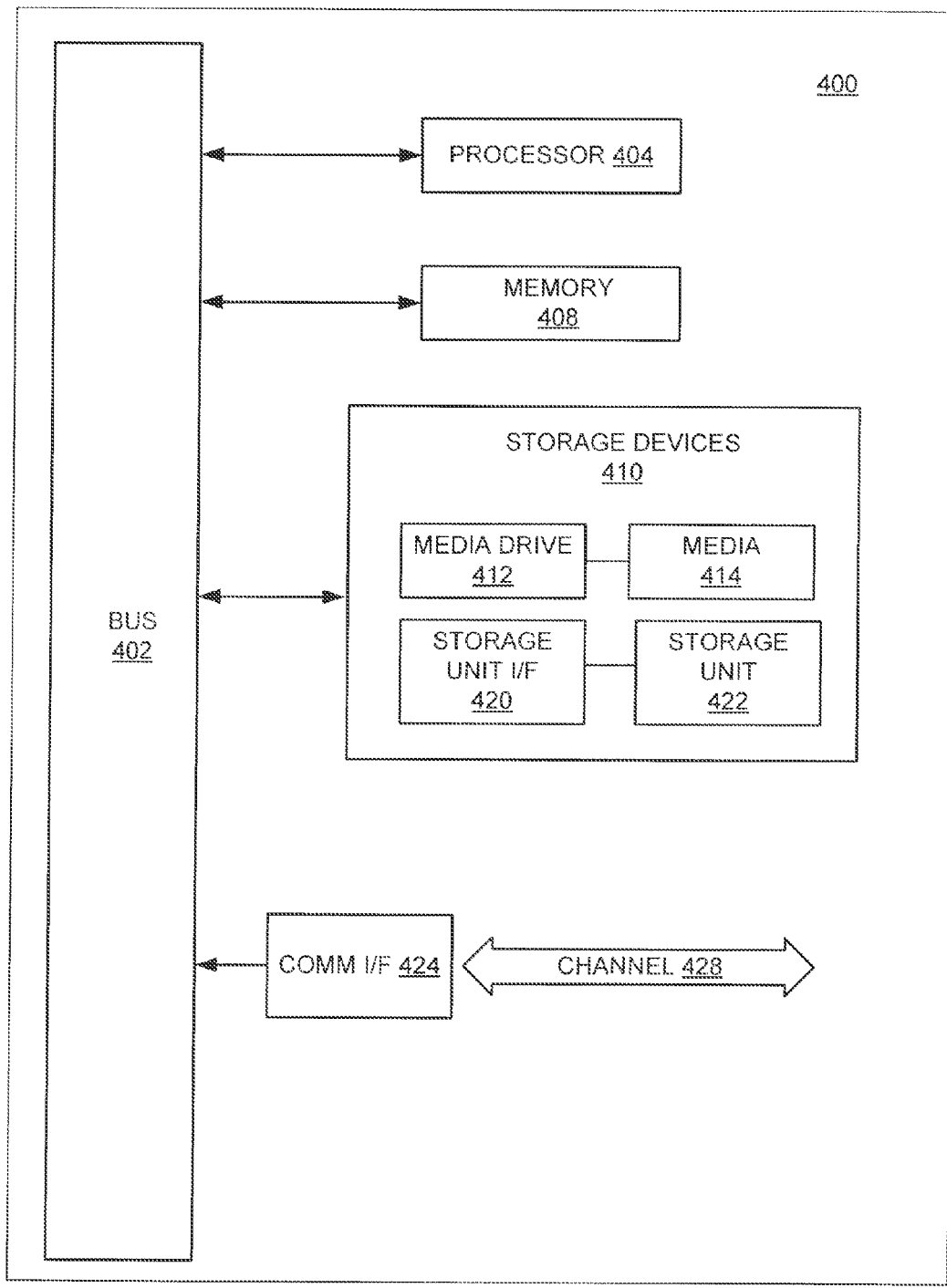
FIG. 4 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the disclosed method and apparatus using other computing modules or architectures.

Referring now to FIG. 4, computing module 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices such as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX (or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the disclosed method and apparatus as discussed herein.

While various embodiments of the disclosed method and apparatus have been described above, it should be understood that they have been presented by way of example only, and not limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method comprising:
   in a network controller node of a Multimedia over Coax Alliance (MoCA) network:
   receiving, from a first node entering the network, a request for discovery of information regarding communication capabilities of a first plurality of nodes in the network;
   obtaining, in response to the request, from one or more nodes of the first plurality of nodes information regarding communication capabilities of the first plurality of nodes; and
   sending the obtained information regarding communication capabilities of the first plurality of nodes to a second plurality of nodes in the network.

2. The method of claim 1, wherein the communication capabilities for a given node comprise information relating to one or more of:
   a MoCA specification version supported by the node;
   whether the node supports Layer-2 Management Entity (L2ME);
   the aggregation capability of the node;
   whether the node supports 16-node;
   whether the node supports a preferred network controller node;
   receive capabilities of the node;
   transmit capabilities of the node;
   node personality;
   the node's host interface; and
   whether the node supports channel bonding.

3. The method of claim 2, wherein one or both of the receive capabilities and the transmit capabilities comprise information relating to whether the node supports TSpec.

4. The method of claim 1, comprising obtaining the information based on broadcast of one or more requests by the network controller node to all nodes on the network.

5. The method of claim 1, wherein the request comprises information specifying network nodes that make up the first plurality of network nodes.

6. The method of claim 1, wherein the request comprises information specifying which communication capabilities to obtain.

7. The method of claim 1, comprising broadcasting the obtained information regarding communication capabilities of the first plurality of nodes to all of the nodes in the network.

8. The method of claim 1, comprising:
   discovering capabilities of all nodes in the network;
   storing the capabilities of all nodes in the network; and
   sending the capabilities of all nodes in the network to a network node that requests such capabilities.

9. The method of claim 1, comprising:
   discovering capabilities of all nodes in the network;
   storing the capabilities of all nodes in the network; and
   sending the capabilities of all nodes in the network to a new node in the network.

10. The method of claim 1, comprising:
    discovering capabilities of all nodes in the network;
    storing the capabilities of all nodes in the network; and
    sending the capabilities of all nodes in the network to a higher-layer network management system.

11. A system comprising:
    a network controller node of a Multimedia over Coax Alliance (MoCA) network, wherein the network controller node:
    receives, from a first node entering the network, a request for discovery of information regarding communication capabilities of a first plurality of nodes in the network;
    obtains, in response to the request, from one or more nodes of the first plurality of nodes information regarding communication capabilities of the first plurality of nodes; and
    sends the obtained information regarding communication capabilities of the first plurality of nodes to a second plurality of nodes in the network.

12. The system of claim 11, wherein the communication capabilities for a given node comprise information relating to one or more of:
    a MoCA specification version supported by the node;
    whether the node supports Layer-2 Management Entity (L2ME);
    the aggregation capability of the node;
    whether the node supports 16-node;
    whether the node supports a preferred network controller node;
    receive capabilities of the node;
    transmit capabilities of the node;
    node personality;
    the node's host interface; and
    whether the node supports channel bonding.

13. The system of claim 12, wherein one or both of the receive capabilities and the transmit capabilities comprise information relating to whether the node supports TSpec.

14. The system of claim 11, wherein the network controller node obtains the information based on broadcast of one or more requests by the network controller node to all nodes on the network.

15. The system of claim 11, wherein the request comprises information specifying network nodes that make up the first plurality of network nodes.

16. The system of claim 11, wherein the request comprises information specifying which communication capabilities to obtain.

17. The system of claim 11, wherein the network controller node broadcasts the obtained information regarding communication capabilities of the first plurality of nodes to all of the nodes in the network.

18. The system of claim 11, wherein the network controller node:
    discovers capabilities of all nodes in the network;
    stores the capabilities of all nodes in the network; and
    sends the capabilities to a network node that requests such capabilities.

19. The system of claim 11, wherein the network controller node:
    discovers capabilities of all nodes in the network;
    stores the capabilities of all nodes in the network; and
    sends the capabilities to a new node in the network.

20. The system of claim 11, wherein the network controller node:
    discovers capabilities of all nodes in the network;
    stores the capabilities of all nodes in the network; and
    sends the capabilities to a higher-layer network management system.

* * * * *